United States Patent [19]

Gwin et al.

[11] 3,777,101
[45] Dec. 4, 1973

[54] WELDING TORCH OSCILLATOR

[76] Inventors: Richard B. Gwin, 2730 Nottingham St., Arlington; William L. Ballis, 661 Leap Rd., Hilliard; Claude W. Churchheus, Box 192, Laurelville; Bruce L. Hutt, 2724 Elliott Ave., Valley View, all of Ohio

[22] Filed: May 16, 1972

[21] Appl. No.: 253,907

Related U.S. Application Data

[62] Division of Ser. No. 189,175, Oct. 14, 1971.

[52] U.S. Cl. ............... 219/60 A, 219/125 R, 228/45
[51] Int. Cl. .............................................. B23k 9/02
[58] Field of Search ...................... 219/125 R, 60 A, 219/60 R, 61, 76, 137; 228/45

[56] References Cited
UNITED STATES PATENTS

| | | | |
|---|---|---|---|
| 3,555,239 | 1/1971 | Kerth | 219/125 R |
| 3,035,156 | 5/1962 | Staky | 219/125 R |
| 3,135,850 | 6/1964 | Scheller et al. | 219/60 A |
| 2,472,803 | 6/1949 | Beyer et al. | 219/125 R |

*Primary Examiner*—R. F. Staubly
*Assistant Examiner*—L. A. Schutzman
*Attorney*—Harold L. Stults

[57] ABSTRACT

A welding head clamping and oscillating assembly is disclosed for use in a welding machine having means for supporting and moving the assembly along a joint to be welded. The assembly includes a support platform connected to the assembly supporting means of the welding machine and a support plate slidably mounted on the support platform for reciprocal movement in a direction transverse to the joint to be welded. A welding head clamp is pivotally mounted on the support plate for arcuate oscillating movement in a direction substantially parallel to the direction of the slidable mounting of the support plate and a reversible stepping motor is operatively connected to the clamp for oscillating the clamp about its pivot axis. An electrical control circuit is also provided for the stepping motor and includes logic circuitry for producing a pulse signal at a predetermined frequency and a binary counting circuit for counting a predetermined number of pulses from the signal and producing an output signal when the predetermined number of pulses is counted. The circuit includes means responsive to the output signal and operatively connected to the motor to drive the motor alternately in first and second directions in response to successive output signals from the binary counter thereby to oscillate the welding head clamp assembly about its pivot axis.

15 Claims, 13 Drawing Figures

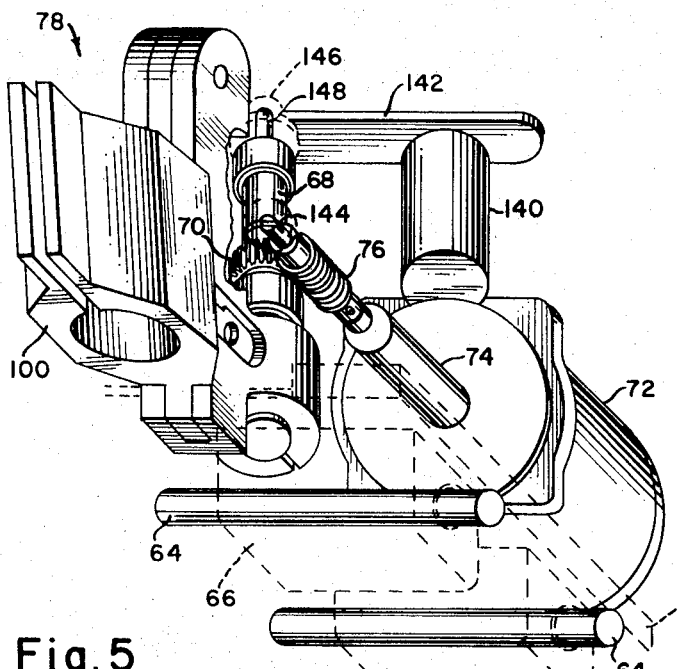
Fig. 5
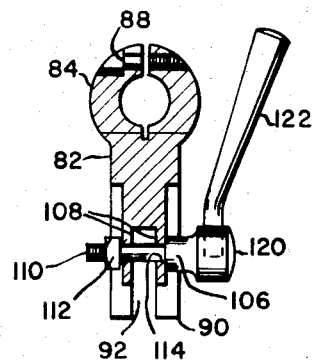
Fig. 7
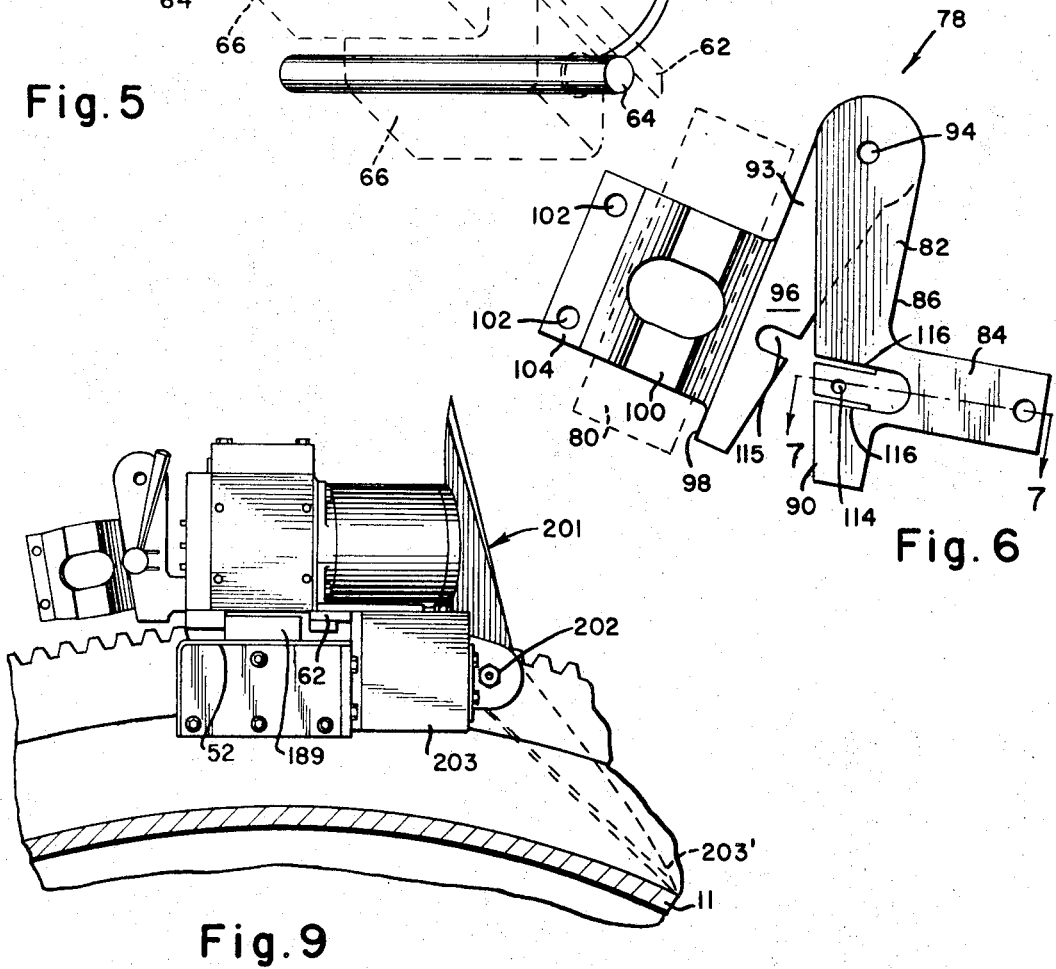
Fig. 6
Fig. 9

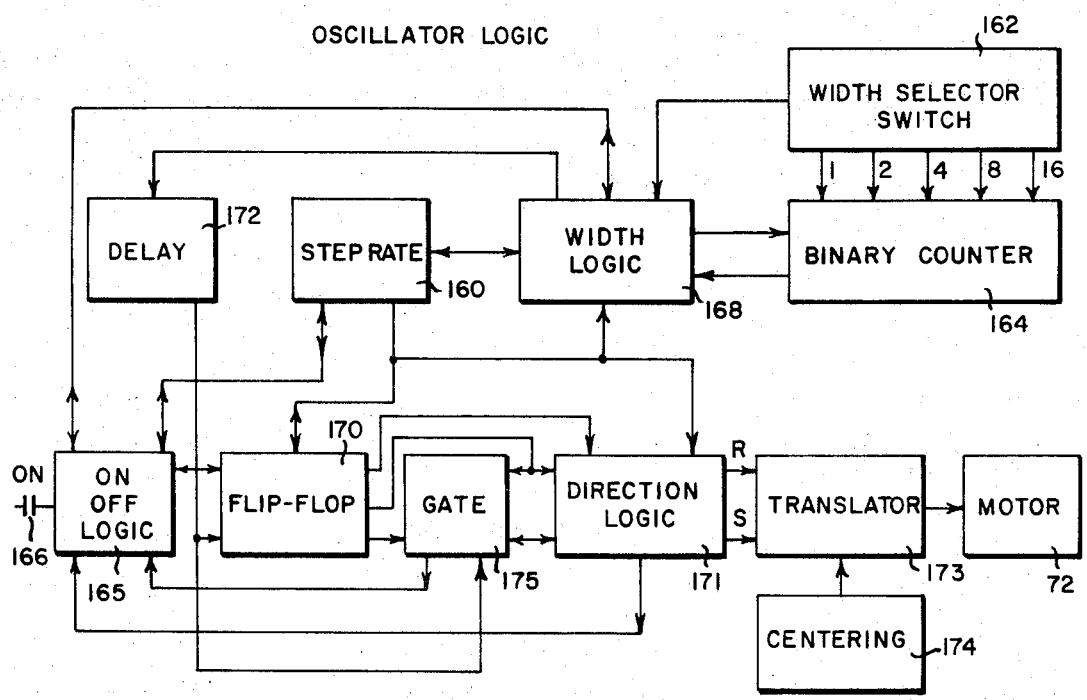
Fig. 8
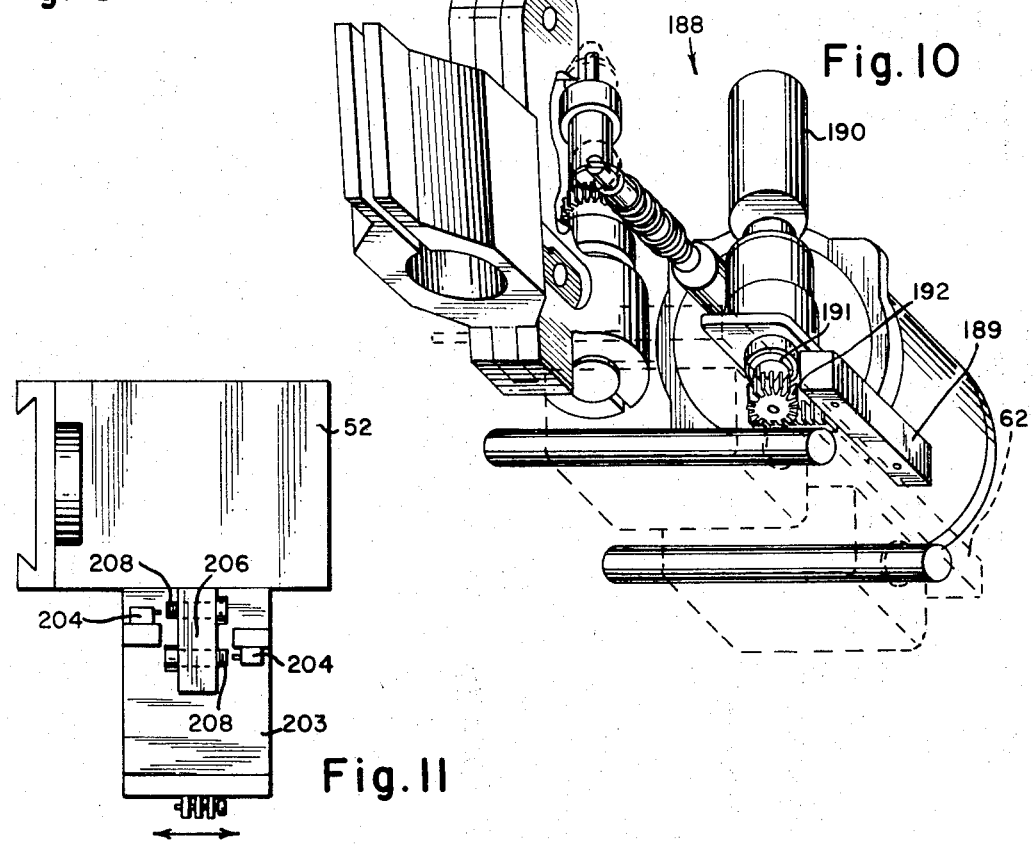
Fig. 10
Fig. 11

WELDING TORCH OSCILLATOR

This is a division, of application Ser. No. 189,175, filed Oct. 14, 1971.

This invention relates to automatic welding processes and in particular to a welding head clamping assembly for oscillating a welding head with respect to a seam or joint being welded. as Oscillation of welding heads, and in particular arcuate oscillation of the welding head or torch across a seam to be welded, has been found to provide a better finished weld since the head is thereby moved more uniformly. Such oscillating patterns are useful in both butt joints or weld overlap application, and a s a result there has been an increased use of welding torch oscillators in the welding industry.

The increasing use of automation in the welding field also has increased the need for reliable methods in automatically oscillating welding torches during the welding process. Further, in the last several years, welding travel speeds, in automatic arc welding processes, have increased substantially, thereby resulting in the need for higher welding torch oscillating speeds. As a result of these factors, and since it is desirable to automate the welding process completely, the need has arisen for a welding torch oscillator which can be controlled remotely or automatically by electrical circuitry.

A number of welding torch oscillators are commercially available today that have not completely satisfied the needs of the welding industry. Most of these commercial oscillators have mechanical linkages which are subject to rapid wear. Such worn linkages can cause errors in the centerline of oscillation of the torch with respect ot the joint and also deviations in the width of oscillation. Further, some of the present oscillators do not have the capability of oscillating at high enough speeds for use with high weld travel speed processes. Typically, such oscillators consist of a variable speed motor connected by mechanical linkages to the welding head to change the rotating motion of the motor to a straight line motion of the torch. The width of the straight line oscillation is usually controlled manually by adjusting the appropriate linkage section. Such systems are, therefore, not suitable for automated processes.

It is also desirable in automatic processes to maintain the centerline of the welding head oscillation in alignment with the centerline of the joint being welded. It often occurs that the end planes of the pipes forming the joint being welded are not perpendicular to the longitudinal axis of the pipes or that the pipe diameters are not exactly the same. Therefore, if an automatic welding machine is placed on the two pipe joints, the travel plane of the fixed welding heads will not be parallel to the welding groove and so it is necessary for the welding head to be tracked with the joint during an automated welding process.

Accordingly, it is an object of the present invention to oscillate a welding torch head during a welding process while simultaneously tracking the head with respect to the joint being welded.

Another object of the present invention is to oscillate a welding torch in an automatic and accurately controlled manner with a relatively simple electromechanical system.

Yet another object of the present invention is to provide a welding torch oscillator which is relatively simple in construction, inexpensive to manufacture and efficient in operation.

It is another object of the present invention to provide a welding torch oscillator head wherein the width, frequency and centerline of the oscillations can be varied automatically by the operator for different weld passes.

In accordance with an embodiment of the present invention a welding torch clamping and oscillating assembly for use in a pipeline welding machine having a ring gear for supporting and moving the assembly along a joint between two pipes to be welded, is provided which includes a support platform and means for connecting a support platform to the ring gear of the welding machine. A support plate is slidably mounted on the support platform for reciprocal movement in a direction transverse to the joint to be welded and a pivot shaft is rotatably mounted in the support plate and extends generally perpendicularly thereto. A spur gear is rigidly secured to the pivot shaft and a reversible stepping motor is operatively connected to the spur gear by a worm gear mounted on its output shaft to oscillate the pivot shaft about its axis of rotation. A welding torch clamp is rigidly connected to the pivot shaft for arcuate oscillation therewith in a direction substantially parallel to the direction of sliding movement of the support plate.

A guide arm is mounted on the support plate and extends from the plate to a position below the support platform. The guide arm has a guide member adapted to be positioned in the joint to be welded and located on the guide arm in a position to be in a common plane with the tip of a welding head mounted in the clamp when the clamp is at the central point of its path of oscillation. The guide member tracks in the joint to be welded as the assembly is moved therealong by the ring gear, to move the support plate and thus the welding torch clamp with respect to the platform in response to variations in the lateral location of the joint, so that the welding head will oscillate with equal amplitude on either side of the joint. This embodiment of the invention is adapted for use in a number of welding processes and in particular it is contemplated that the apparatus can be used to perform the root and filler passes in the automatic pipeline welding method described and claimed in U.S. Pat. application Ser. No. 118,449, filed Feb. 24, 1971, and commonly assigned herewith. The disclosure of that application is incorporated herein by reference.

In another embodiment of the invention, which is adapted for use in the cap pass of the welding process, that is, the pass wherein the joint is substantially filled with weld metal so that it is not feasible to track the welding head during the pass, the guide arm is eliminated and a rack gear is mounted on the support platform for cooperation with a selectively operable reversible electric motor mounted on the support plate and geared to the rack. By selective operation of the electric motor, the relative position of the support plate with respect to the platform may be adjusted so that the welding tip is centered with respect to the joint at the beginning of the welding operation and held by the motor in that fixed position during the welding process.

The above, and other objects, features and advantages of this invention, will be apparent in the following detailed description of illustrative embodiments thereof, which are to be read in connection with the accompanying drawings, wherein:

FIG. 5 is a schematic perspective view, with parts removed, of the apparatus illustrated in FIG. 3;

FIG. 6 is an enlarged side view of the welding torch clamp utilized in the assembly of the present invention;

FIG. 7 is a sectional view taken on line 7—7 of FIG. 6;

FIG. 8 is a schematic block diagram of the electronic control circuit for the stepping motor utilized in the assembly of the present invention;

FIG. 9 is a side view of a welding head clamping and oscillating assembly in accordance with another embodiment of the present invention;

FIG. 10 is an enlarged perspective view similar to FIG. 5 of the assembly illustrated in FIG. 9;

FIG. 11 is a bottom view of the apparatus illustrated in FIG. 9;

Figure 1:
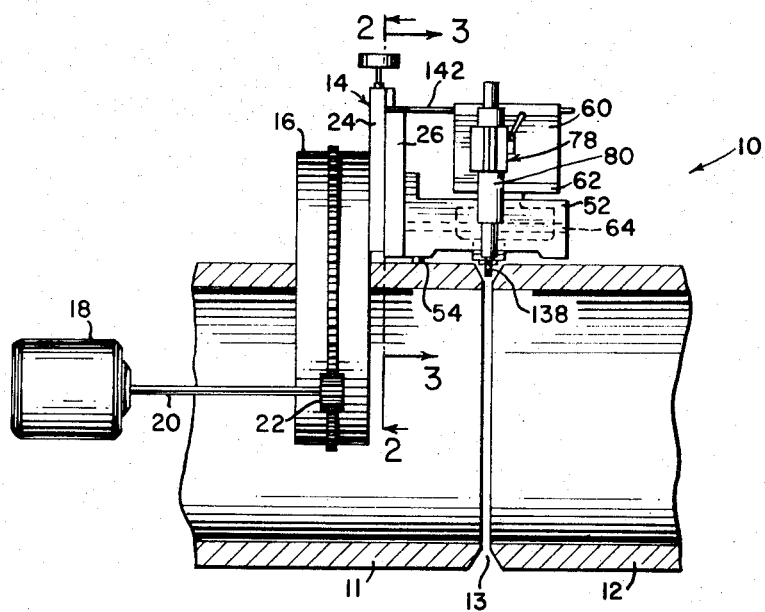
FIG. 1 is a schematic representation of a specific embodiment of an apparatus constructed to perform in accordance with the present invention and mounted on a welding machine adjacent to a joint to be welded.

Referring to the drawing in detail, and initially to FIG. 1 thereof, it will be seen that a welding head clamping and oscillating assembly 10, is shown mounted in position to weld two pipeline sections 11 and 12 meeting at a joint 13.

The assembly 10 includes a connecting mechanism 14 by which the assembly is mounted on a ring gear 16. The latter is driven about the periphery of the pipeline 11 by an electric motor 18 through its shaft 20 and a pinion gear 22 mounted thereon and engaged with ring gear 16. In this manner the assembly 10 is movable about the circumference of the pipeline during the welding operation. The ring gear is capable of movement along the length of the pipeline in any conventional manner in order to move the assembly 10 to successive weld joints after completion of a welding operation.

Figure 2:
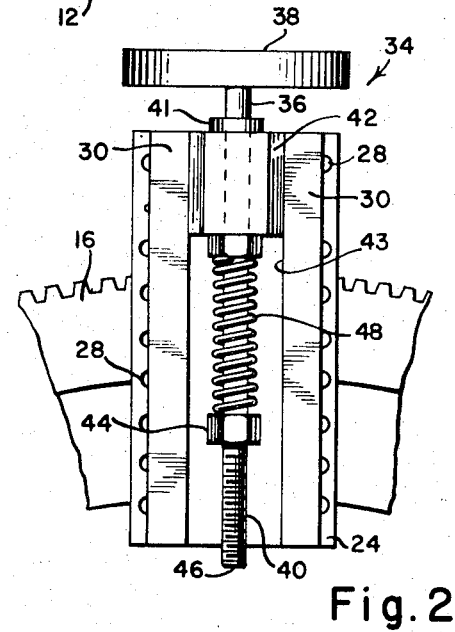
FIG. 2 is an enlarged view taken on line 2—2 of FIG. 1 illustrating a portion of the mounting mechanism connecting the welding head assembly to the welding machine.

Mounting mechanism 14 includes a pair of plates 24 and 26 which connect assembly 10 to ring gear 16 and yet permit relative movement between assembly 10 and ring gear 16 in a radial direction with respect to the pipes 11 and 12. Plate 24 is rigidly connected by bolts 28 (Figures), to ring gear 16 and includes a dove tail flanged surface 30 on the side thereof opposite ring gear 16. Flange 30 is received in and cooperates with a complementary dove tail recess 32 in plate 26 and as a result, the assembly 10 is held adjacent ring gear 16, but may be slidably moved with respect thereto in a radial direction. Such movement is limited by an adjustment and biasing mechanism 34 which includes a rod 36 having a handle 38 at one end thereof and threaded free end portion 40. Rod 36 extends in a generally radial direction with respect to ring gear 16, through a boss 42 secured in recess 43 of flange 30 and is slidably movable therein. A nut 44 is threadedly engaged on threaded end portion 40 of rod 36 in spaced relation to the tip 46 thereof. A compression spring 48 is engaged between boss 42 and nut 44 to bias rod 36 downwardly, as seen in FIG. 2, while permitting relative movement between the rod and plate 24. A stop 41 is provided on rod 36 on the opposite side of boss 42 from spring 48 and adjacent handle 38 to limit the downward movement of the rod with respect to the plate 24 under the influence of spring 48. End 40 of rod 36 is threadedly engaged in a boss 50, see FIG. 4, secured to plate 26. As a result, it is seen that plate 26 is also urged downwardly with respect to plate 24 by spring 48. The amount of force applied to plate 26 is, of course, a function of the position of nut 44, and the initial position of plate 26 and thus assembly 10 with respect to plate 24 and ring gear 16 may be varied by rotation of wheel 38, providing wheel 54 does not come in contact with pipe 11.

A support platform 52 is rigidly secured to plate 26 and is thus biased radially downwardly with that plate by spring 48. A wheel 54 is rotatably mounted on a shaft 56 in support platform 52 along an axis which is generally perpendicular to the axis of rod 36. Thus, the axis of rotation of wheel 54 is on a radial line with respect to ring gear 16 and the pipe 11. The wheel is urged into contact with the surface of pipe 11 by the downward bias of spring 48 and facilitates the movement of the assembly along the surface of the pipe during the welding operation. It is noted that by the specific location of the axis of rotation of the wheel and its point of contact with the pipe along a radial line, the possibility of tilting or jamming of the assembly during movement along the pipe is avoided.

A housing 60 (FIGS. 1 and 4), including a bottom support plate 62, is mounted on support platform 52, which is a hollow generally rectangular member, for sliding reciprocal movement with respect to the platform in a direction transverse to the joint 13 to be welded. This is achieved by the provision of parallelly arranged cylindrical rods 64 mounted within platform 52. A pair of bearing members 66 are secured to the lower surface of plate 62 (see FIG. 5) and receive rods 64 therein to permit sliding movement of plate 62 with respect to the rods and support platform 52. This sliding movement of the present invention, as is more fully described hereinafter, is utilized to permit tracking of the assembly with respect to joint 13.

Figure 3:
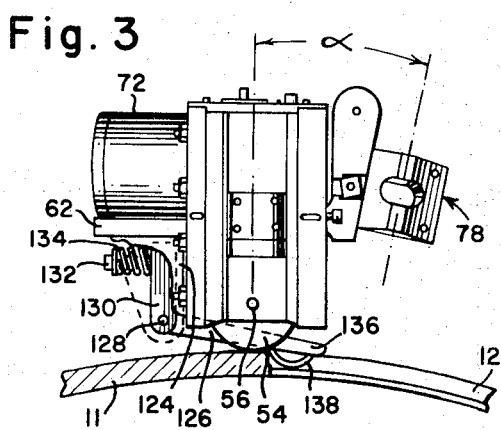
FIG. 3 is a side view of the apparatus taken on line 3—3 of FIG. 1.

A pivot shaft 68 is rotatably mounted in plate 62 in any conventional manner. Shaft 68 extends in a generally perpendicular vertical direction, as seen in FIGS. 3 and 5, from plate 62 and has a spur gear 70 rigidly mounted thereon. A conventional stepping motor 72, i.e. a motor which turns through a discrete angular movement upon the application of a signal or pulse, is also mounted on plate 62 an includes a drive shaft 74 having a worm gear 76 thereon mounted in position for meshing engagement with spur gear 70. Motor 72 is controlled by an electronic circuit, more fully described hereinafter, to oscillate its shaft over a predetermined range and thereby oscillate shaft 68 about its pivot axis.

A welding head clamp assembly 78 is rigidly secured to shaft 68 and oscillated with the shaft under the influence of motor 72. Clamp assembly 78 is adapted to secure a welding head or torch 80 therein and hold the torch in a predetermined fixed position with respect to the weld joint 13 during the welding operation. The assembly includes a first mounting portion 82 which has a split ring collar 84 formed integrally therewith along its back edge 86. Split ring collar 84 receives and surrounds pivot shaft 68 and is clamped thereto by means of a bolt 88 extending between the split portion of the ring, as seen in FIG. 7. The forward edge 90 of member 82 includes a generally rectangular recess 92 therein which is adapted to receive the second mounting portion 93 of the clamp assembly.

Member 93 is pivotally connected to member 82 by pivot pin 94 adjacent the top of the assembly. The rear portion 96 of member 92 has a configuration which is generally complementary to recess 92 and is received in the recess in the closed configuration of the assembly during the welding operation. The forward edge portion 98 of member 93 includes a split ring clamp 100 in which welding head or torch 80 is received. A pair of bolts 102 extend between the ears 104 of collar 100 to provide a clamping action of the sides of the collar against the torch 80 in a conventional manner.

Figure 4:
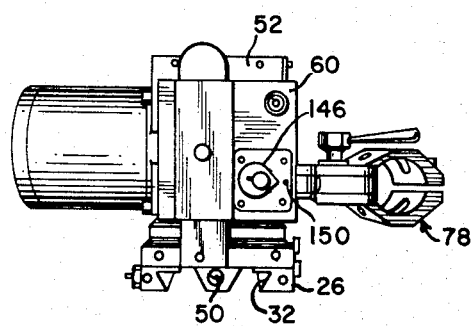
FIG. 4 is a plan view of the apparatus illustrated in FIG. 3.

Members 82 and 93 are held in their closed configuration, seen in FIGS. 3-5, by a clamping mechanism which includes a bolt 106 extending between the sides 108 of member 82 which define recess 92. Bolt 106 has a threaded end portion 110 threadedly engaged with a nut 112, as seen in FIG. 7. To enhance the clamping action of this bolt assembly, the sides 108, in the area of the apertures 114 through which bolt 106 extends, may be formed at a thinner dimension than the remainder of member 82 so that they are somewhat flexible to "give" and thus more readily be moved against the surface portion 96 of member 93 to hold the same within recess 92. As seen in FIG. 6, member 96 has a recess 115, which fits around bolt 106 in the closed position of the assembly.

The recessed portion of sides 108 adjacent apertures 114 is generally rectangular and the sides 116 thereof adjacent nut 112 will act as a restraint upon rotation of the nut so that the tension on sides 108, produced between the nut 112 and the head 120, of bolt 106 may be relieved simply by turning the bolt. To this end a handle 122 is secured to the head 120 in any convenient manner, to facilitate rotation of the bolt.

In previously proposed clamping arrangements, the welding torch had to be removed from the clamp when the necessity for cleaning arose. Since in many welding processes, the distance from the tip of the torch to the weld joint is critical, it was necessary in such previously proposed welding head clamps to accurately and painstakingly readjust this distance on each cleaning of the welding torch. With applicants' clamp as described above, this problem is avoided since the pivotal mounting of the welding torch 80 about pivot pin 94 permits the welding torch to be selectively swung away from the joint 13 in the event that cleaning of the tip thereof is required. Thus, cleaning of the tip can be accomplished without the necessity of removing the torch from the clamp itself.

It is also noted that collar 100 is at a slight angle with respect to the axis of shaft 68 and thus is also at a slight angle α, generally 5° with respect to the radius of a pipe being welded (see FIG. 3). This feature is advantageous since, as the assembly is moved by ring gear 16 with the torch at the trailing end thereof, that is, the assembly is moved to the left in FIG. 3 during the welding operation, the welding force, because of the angular mounting of the torch, will tend to support molten weld metal and eliminate sag in the weld, particularly in the overhead positions.

The rear portion of plate 62, as seen in FIG. 3, provides mounting for the motor 72. In addition, it is provided with a depending plate 124 on which a guide arm 126 is pivotally mounted by pivot pin 128. Guide arm 126 is a generally L-shaped member having an upstanding portion 139 which abuts against plate 124. A bolt 132 is threadedly engaged through leg 130 with plate 124 and is surrounded by a compression spring 134 which biases the arm 126 in a generally clockwise direction as seen in the drawing. The free end 136 of guide arm 126 is provided with a guide member 138 which is adapted to be engaged in and follow the joint 13 between the pipes 11 and 12 to be welded. The spring 134 and bolt 132 serve to keep the guide member 138 within the joint during the welding process. It is thus seen that as the assembly 10 is moved about the periphery of pipes 11 and 12 during the welding process with guide member 138 engaged within joint 13, the plate 62 will be slide laterally by the guide arm 126 due to any lateral deviations of the joint 13. In this manner the welding torch is tracked with respect to the joint so that its position with respect to the joint is held constant at all times.

In the preferred embodiment of the invention the clamp 78 is mounted in the apparatus in a position such that the welding torch 80, at the center of its path of oscillation, is in substantial alignment with the guide member 138, as seen in FIG. 1, so that it oscillates with equal amplitude on either side of the centerline of the joint during the welding process in spite of any deviations of the joint. This combination of oscillating motion and sliding motion of the welding head is a substantial improvement over previously proposed arrangements and provides for uniform welding of the joint about the entire periphery of the pipeline.

As mentioned, this apparatus is particularly adapted for use with the welding process described in the above-mentioned U.S. patent application. In particular, this embodiment of the invention is utilized in the root and filler passes of the welding system described therein. During these passes, the joint 13 between the pipeline is sufficiently deep to permit the guide member 138 to track the joint. However, as the last filler pass is made and the head comes around the machine to the starting point of the weld, there is insufficient joint side wall available for the guide member 138 to track. Thus, the possibility results that plate 62 will "float" irradically, thereby causing the welding head to move away from the joint during the last phase of the welding process.

To avoid this possibility, the welding apparatus of the present invention is provided with a solenoid 140 mounted in housing 60 on support plate 62. A metal brake bar 142 is rigidly secured to plate 26 and extends through housing 60 adjacent solenoid 140. The circuitry utilized to control the welding process is programmed such that as the welding head approaches the last three inches of the last filler pass in the welding process, the solenoid 140 is activated and it becomes magnetically engaged with brake bar 142. This programming may be done with conventional electronics or mechanically with cam operated switches connected to the ring gear. As a result, housing 60 and thus plate 62 is held in a fixed position with respect to bar 142 and therefore with respect to platform 52. The welding device then completes the last 3 inches of the welding process with the plate 62 unable to move with respect to the platform 52 and thus with welding head 80 in a fixed position. It has been found that it is unlikely in the span of three inches along the joint between pipelines that there would be sufficient variation in the lateral location of the joint for there to be any substantial effect on the uniformity of the weld produced by the process described in the above-mentioned patent application. The electronics utilized to program the apparatus of the invention forms no part of the invention and the construction of a circuit capable of performing this function is within the skill of an artisan or a practicioner in the art.

Referring again to FIG. 5 of the drawing, it is seen that the shaft 74 of motor 72 is provided with a notch 144 which is adapted to be engaged by a screwdriver for manually rotating the shaft. This end portion of the shaft extends through the forward face of housing 60, which housing encloses the gears 70, 76 and solenoid 140, so it is readily available for engagement and adjustment by a screwdriver. This adjustment is provided so that the tip of a welding head mounted in the clamping assembly may be adjusted at the beginning of the welding operation to be in alignemnt with guide member 138, in the centerline of its path of oscillation. This adjustment is assured by the provision of a pointer or index means 146 on the top end 148 of shaft 58. The pointer is adapted to be aligned with a dot 150, located in a predetermined position on the top surface of housing 60, when the shaft 68 is in the position wherein it is at the centerline of its range of oscillation. Accordingly, by rotating shaft 74 and thus worm gear 76, the shaft 68 can be manually rotated until the pointer 146 aligns with the dot 150. It is also noted that the provision of the spur gear 70 and worm gear 76 prevents inadvertent movement of the shaft 68, other than by the rotation of the shart 74 in the manner described, or by driving the shaft 74 by the motor 72.

With the welding head clamping assembly adjusted in this manner, the welding operation may begin. The oscillation of the clamp and welding head is controlled by the logic circuit illustrated in block diagrams in FIG. 8. This circuit includes a step rate selector circuit 160 which is adapted to produce pulse signals at a preselected rate. This rate is selected by a conventional potentiometer connected to the circuit and is selected in accordance with the desired frequency of oscillation for the welding head. Thus, the greater the frequency of the pulses, the greater will be the speed of oscillation of the welding head. The width or amplitude of the oscillation is controlled by the binary counter which counts a preselected number of pulses to be passed to motor 72 for each oscillation. Thus, the greater the desired width, the greater the number of pulses will be. This width is manually selected from width selector switch 162 which determines the number of pulses binary counter 164 will count.

Since it is desirable to begin welding operations at the center of the joint to be welded, the clamping assembly is adjusted as described above so that the welding torch is in the center of the joint. Thus it is necessary to drive the welding torch first in one direction (S), for example to the left in FIG. 1, half the number of pulses for the preselected desired oscillation. To this end an on-off logic circuit 165 is provided which is activated when the on-off switch 166 is turned on. At the initial portion of the operation, the step rate circuit 160 is activated to produce pulses at the preselected frequency and this signal is sent to the width logic circuit 168 and flip-flop 170. The width logic circuit is connected to binary counter 164 which normally counts the predetermined number of pulses and, when this number is counted, returns a signal to the width logic circuit 168 instructing it to perform the next function. During the initial phase however, the signal from the width logic circuit controls the flip-flop 170, through logic circuit 165, to permit only one half the desired number of pulses to pass through the direction logic circuit 171 to the translator circuit 173, which is preset to drive the motor in the first (or left) directions.

The pulses presented to the direction logic from step rate circuit 160 pass through the direction logic only when it is closed by a signal from the on-off logic circuit 165 or from the delay 172. During the initial portion of the oscillation, the width logic 168 is controlled by the on-off logic circuit 166 which thus controls the number of pulses permitted to pass through the direction logic. After the on-off logic is closed, the width logic turns the direction logic off after one half of the preset width pulses are counted. During the remainder of the operation the pulses produced by the step rate circuit 160 continue to pass through direction logic 171 and are simultaneously counted by counter 164. When the preselected number of pulses are counted, as determined by the desired oscillation width, the welding head is at the extreme end of its desired oscillation and the counter 164 sends a signal to the width logic circuit 168 which in turn activates the delay 172 to open the gate 175 and prevent further pulses from the step rate circuit 160 from passing through the directional logic to the translator and motor. The delay is held for a predetermined adjustable period, set, for example, by a potentiometer, so that the welding head is held at the end of its oscillation for a desired time period. This is often required in traveling welding operations, such as that described herein and in the above-mentioned patent application, in order to accommodate the travel speed of the mechanism.

After the delay period, the flip-flop is pulsed to change its output state. The flip-flop energizes the width logic which in turn activates the step rate. The flip-flop change in state also causes a change in the direction logic so that the step rate pulses pass through the R lead to the translator. This moves the weld torch in the R direction, for example, to the right in FIG. 1, a number of pulses equal to the present valve on the width selector. The counter 164 sends a signal to the width logic circuit which in turn activates the delay 172 and turns off the pulses from the step rate. After the delay period the flip-flop is again pulsed to change its state. The flip-flop energizes the width logic which starts the step rate and changes the direction logic so that the pulse passes through the S lead to the translator.

The translator 173 between the direction logic and motor 72 in the circuit illustrated in FIG. 8 is a conventional circuit utilized and supplied as part of conventional stepping motors to convert the pulse signal to a usable sequence for the motor. A centering override 174 is provided in order to manually drive the motor 72 to the center position should that be required.

At the end of the welding process, the on-off switch 166 is closed, however, the oscillation of the motor 72 is not immediately shut off and the circuit continues in operation until the welding torch is stopped in its proper position. The torch must be stopped after it has moved half way in the first direction mentioned above, i.e., in the direction of motion in which it will start again during the next operation. Thus, the direction logic is wired to instruct the on-off circuit of the position of the welding head during the welding oscillation and if the desired stopping point has been passed, that is, if the welding head has moved past the centerline, in its leftward movement in FIG. 1, the on-off circuit is held on so that the circuit remains in operation until the welding head is driven back across the joint to the right and begun to move to the left again. Then after the delay and when the head begins moving leftward again, the on-off logic circuit and width logic circuit control the flip-flop to permit only half the predetermined number of pulses counted by the binary counter to pass therethrough to the direction logic circuit so that the welding head is only driven back half way, i.e., to the center of the joint. In the event that the on-off switch is turned off during the delay period when the welding head is at the right of the joint as seen in FIG. 1, or as it is moving towards the center of the joint, but before it reaches the center of the joint, then the on-off logic circuit is designed to control the circuit to stop the motor when the welding head reaches the center of the joint.

The particular circuitry utilized in each of the blocks described in FIG. 8 of conventional construction and it is the combination of these conventional circuits, as described above and as shown in the block diagram which is novel to applicants herein. Accordingly, the specific detailed circuit diagram for each of these blocks is not required and the above description and the circuit diagram of FIG. 8 is sufficient for one skilled in the art to produce the circuit in accordance with the invention.

It is contemplated that two welding head assemblies will be simultaneously used in performing the welding operation described in the above-mentioned patent application. These welding heads will be used simultaneously and in general will be located on opposite sides of the pipe being welded during the welding operation. When welding the root and filler passes, the welding heads are independently controlled since they are tracked as described above by the guide member 126. However, when the cap pass is made, the welding heads cannot be independently tracked, since the weld joint will be substantially filled during the cap pass and tracking of the weld head by the guide member 138 will be impractical. Thus, when the welding head clamping and oscillating assembly of the present invention is to be used to form the cap pass of a welding operation as described in the above-mentioned patent application, some modification must be made thereto. Accordingly, a modified welding head 188 (FIG. 10) is provided for the cap pass wherein the guide arm 126 and its associated equipment are eliminated. In lieu thereof, the support platform 52 is provided with a rack 189 rigidly secured thereto. A reversible electric motor 190 (this motor replaces the brake of the head oscillator) is mounted in housing 60 and has an output shaft 191 on which a pinion 192 is secured in meshing engagement with the rack. The motor 190 is conventionally controlled for reversible operation so that the plate 62 can be reciprocated with respect to platform 52 on the rods 64.

Figure 12:
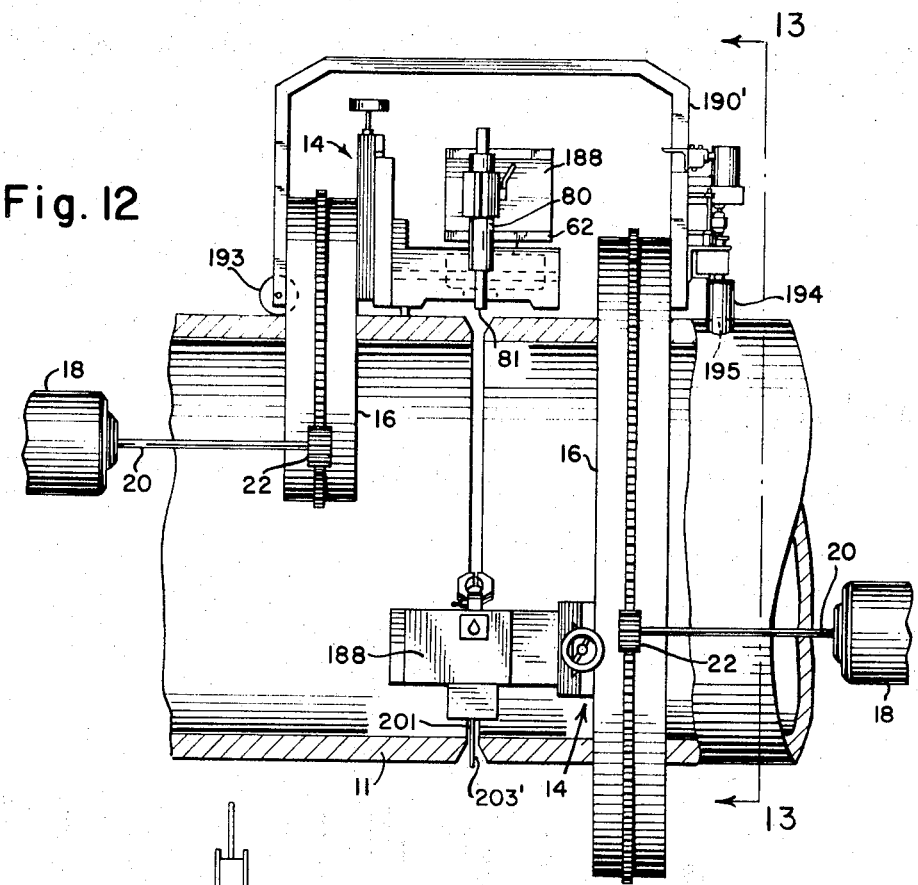
FIG. 12 is a schematic representation of a welding machine in which the welding head clamp of FIG. 9 is utilized.
Figure 13:
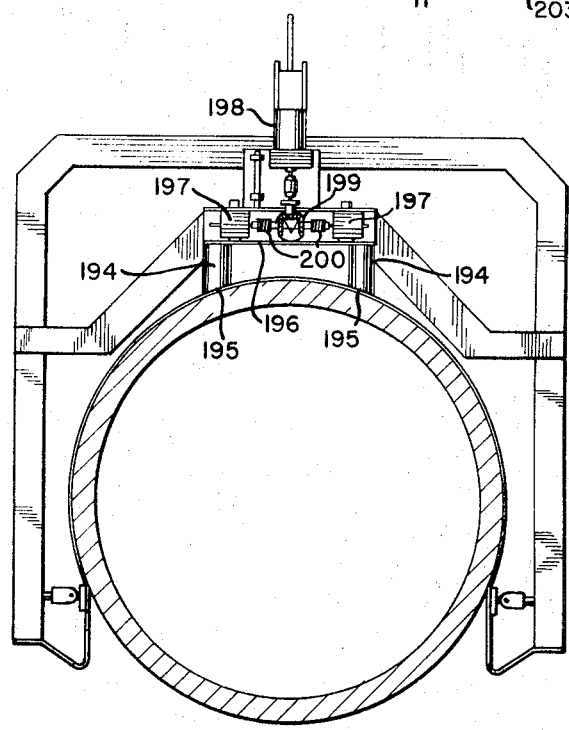
FIG. 13 is a secitonal view taken on line 13—13 of FIG. 12.

As mentioned, the welding operation is performed with two welding heads (FIG. 12), each of which is mounted on a ring gear 16 by a connecting mechanism 14, similar to that described above. The ring gears are rotatably mounted on a common frame 190' and are driven about the periphery of pipeline 11 by electric motors 18, shafts 20 and pinion gears 22. Frame 190' is seated on pipeline 11 by at least one pair of spaced rollers 193 (only one of which is shown) located at the left end of frame 190' and a pair of support arms 194 (note FIG. 13) which are vertically adjustable in frame 190'. Support arms 194 have beveled surfaces 195 which engage the outer surface of the in place pipe and are integrally interconnected by a cross piece 196. The latter is mounted on the frame 190' for vertical movement with respect thereto and is operably engaged on its upper surface by a pair of screw jacks 197 which are rotated by motor 198 on frame 190' through bevel gears 199 and worm gear 200. By this arrangement frame 190' may be tilted about rollers 193 to adjust the relative position of frame 190' and thus ring gears 16 with respect to the pipeline. This adjustment capability of the frame is utilized as more fully described hereinafter to align the torches in heads 188 with the groove 13 between the pipelines. To accomplish this, one of the heads 188 is provided with a guide pointer 201 (FIGS. 9 and 12) pivotally secured by pivot pin 202 on extension 203 at the rear of its plate 62. In the illustrative embodiment the lower head 188 shown in FIG. 12 is provided with pointer 201.

At the beginning of the cap pass welding operation, the pointer 201 of the lower head 188 is in its retracted position, seen in solid lines in FIG. 9, and the heads are moved into the positions shown. If the welding tip 81 of torch 80 in the upper head does not align with the center of the groove, the operator operates the appropriate switch to activate its motor 190 to drive plate 62 to a position wherein the end 81 of the welding torch is located at the middle of the welding groove 13. When that point is reached, the motor 190 is deactivated and the plate 62 and thus torch 80 is held in that position by the engagement of rack 190 and pinion 196.

Saftey limit switches 204 are positioned in spaced relation in the extension 203 of plate 62. These limit switches cooperate with an extension 206 on platform 52, which extension has a pair of bolts 208 or the like secured therein for engagement with the limit switches 204. These switches control motor 190 and override the manual control when the plate 62 has been driven to its extremes in either direction, as determined by the spacing of switches 204. This arrangement provides a safety feature in the apparatus which avoids damage to the bearings and to the rack and pinion assembly. In the event that the operator is unable to align the welding torch with the center of the joint by movement of plate 62 within the range defined by switches 204, then the entire welding mechanism including ring gear 16 must be moved into closer alignment with the joint in order to position the welding head adjacent the joint.

It has been found advantageous to electrically interconnect the motors 190 of each of the heads 188 so that they will move simultaneously in opposite directions when the motors are activated. As a result, the motors 190 move their associated plates 62 and thus their torches 80 simultaneously in opposite directions. Thus, when torch 80 in the upper head 188 is moved to its centered position, the torch on the lower head will be mvoed in the opposite direction to a position in alignment with the first mentioned torch towards the groove 13. That is, assuming the torch 80 in the upper head in FIG. 12 is out of alignment with groove 13, and on the right side of the groove, then the down torch will be on the left side of the groove. As the first torch is moved to the left towards the groove the lower torch will move to the right, also towards the groove. Thus, when the top torch tip is aligned with the groove, the lower torch tip should be similarly aligned. To check this alignment, guide pointer 200 on the lower head is moved to its dotted line position as shown in FIG. 9. The pointer is mounted in alignment with the torch tip and its end 203 will be diametrically located with respect to torch tip 81 of the upper head when the heads are in the position shown in FIG. 12. In the event that end 203' does not align with groove 13, because, for example, the groove is at an angle to the longitudinal axis of the pipeline, the motor 198 can be operated to drive jacks 197, thereby causing the right end of frame 190' to rise with respect to supports 194 so that the frame is tilted. Motor 198 is operated until the frame is tilted about rollers 193 to a position wherein the end 203' of the pointer is in the groove. Generally, only a slight tilt of frame 190' is required, and since the tip 81 of the upper torch is closer to the pivot axis than the tip of the lower head, tip 81 remains essentially stationary and located within the confines of the groove. In this manner, the plane of travel of the heads is made to coincide with the plane of the groove or joint 13. After the adjusting operation is completed, both assemblies then remain fixed, due to the engagement of racks 189 with pinion 192, and, when rotated simultaneously, will follow the joint between the pipes as their respective torches are oscillated by motors 72.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. A welding head clamping and oscillating assembly for use in a welding machine having means for supporting and moving said assembly along a joint to be welded, said assembly comprising, a support platform, means for connecting said platform to the assembly supporting means of a welding machine, a support plate, means for freely slidably mounting said support plate on said support platform for reciprocal movement in a direction transverse to said joint, a welding head clamp, means for pivotally mounting said clamp on said support plate along a pivot axis extending generally perpendicularly to the plate for arcuate oscillating movement in a plane extending substantially parallel to said support plate and in a direction substantially parallel to the direction of slidable mounting of said support plate and transversely of said joint, and a reversible stepping motor operatively connected to said clamp for oscillating the clamp about said perpendicularly extending pivot axis.

2. The welding head clamping and oscillating assembly as defined in claim 1 including a pivot shaft rotatably mounted at one end in said plate and extending generally perpendicularly thereto along said pivot axis, and a spur gear rigidly secured to said shaft, said stepping motor having an output shaft extending perpendicularly to said pivot shaft and a worm gear secured to the end of said output shaft in meshing engagement with said spur gear for oscillating said pivot shaft and said welding head clamp being rigidly secured to said pivot shaft for oscillation therewith.

3. The welding head clamping and oscillating assembly as defined in claim 2 wherein said stepping motor shaft has a free end extending beyond said worm gear and includes means at said free end for manually rotating said shaft whereby the position of said welding head clamp may be manually adjusted.

4. A welding head clamping and oscillating assembly for use in a welding machine having means for supporting and moving said assembly along a joint to be welded, said assembly comprising, a support platform, means for connecting said platform to the assembly supporting means of a welding machine, a support plate, means for freely slidably mounting the support plate on said support platform for reciprocal movement in a direction transverse to said joint, a welding head clamp, a pivot shaft rotatably mounted at one end in said support plate and extending generally perpendicularly thereto, a spur gear rigidly secured to said shaft, a welding head clamp rigidly secured to said pivot shaft for arcuate oscillation therewith in a direction substantially parallel to the direction of the slidable mounting of siad support plate, a reversible stepping motor for oscillating the clamp and shaft about the longitudinal axis of the shaft, a spur gear rigidly secured to said shaft, said stepping motor having an output shaft extending perpendicularly to said pivot shaft and a worm gear secured to the end of said output shaft in meshing engagement with said spur gear for oscillating said pivot shaft and said welding head clamp; said stepping motor having a free end extending beyond said worm gear and including means at said free end for manually rotating said shaft whereby the position of said welding head clamp may be manually adjusted; and a housing mounted on said plate and enclosing said pivot shaft and stepping motor output shaft; said free end of said output shaft and the other end of said pivot shaft extending through said housing, first index means on said other end of said pivot shaft and second index means on said housing adjacent said pivot shaft, said first and second index means being respectively located to be adjacent each other when said welding head clamp is in position intermediate the ends of its path of oscillation, thereby to provide a visual indication of said intermediate position of said head and to facilitate positioning of said clamp by said manually rotating means.

5. The welding head clamping and oscillating assembly as defined in Claim 2 including at least two cylindrical rods mounted in said support platform and a pair of elongated bearing members mounted on said plate respectively receiving said rods for slidably mounting said support plate on said platform.

6. The welding head clamping and oscillating assembly as defined in claim 2 wherein said welding head clamp comprises first and second pivotally interconnected members, said first member having a recess on one side thereof which is adapted to receive said second member and a split ring collar on the other side thereof and integral therewith for receiving said pivot shaft, and means for rigidly clamping said collar about said pivot shaft, said second member having a split collar integral therewith on the side thereof opposite said first member for receiving a welding head and means for rigidly clamping said collar about a welding head inserted therein.

7. The welding head clamping and oscillating assembly as defined in claim 6 including means for clampingly engaging the sides of said first member which define said recess with the portion of said second member received therein for selectively preventing pivotal movement of said second member with respect to said first member.

8. The welding head clamping and oscillating assembly as defined in claim 7 wherein the central axis of said split collar receiving a welding head is in the same plane as and at a slight angle to the axis of said pivot shaft.

9. The welding head clamping and oscillating assembly as defined in claim 1 wherein said means for connecting said platform to said assembly supporting means comprises a first plate adapted to be rigidly connected to said assembly supporting means and having a dove-tail flange on the side thereof opposite said supporting means, said flange extending generally perpendicularly of said supporting platform, a second plate rigidly secured to said platform and having a dove-tail recess adapted to slidably receive said flange, and means slidably mounted in said first plate and rigidly connected to said second plate for holding said flange in said recess while permitting relative movement between said first and second plates, whereby said welding head clamping and oscillating assembly is mounted on said supporting assembly and is relatively movable with respect thereto.

10. A welding head clamping an oscillating assembly for use in a welding machine having means for supporting and moving said assembly along a joint to be welded, said assembly comprising, a support platform, means for connecting said platform to the assembly supporting means of a welding machine, a support plate, means for freely slidably mounting said support plate on said support platform for reciprocal movement in a direction transverse to said joint, a welding head clamp, means for pivotally mounting said clamp on said support plate for arcuate oscillating movement in a direction substantially parallel to the direction of the slidable mounting of said support plate, and a reversible stepping motor operatively connected to said clamp for oscillating the clamp about its pivot axis; said means for connecting said platform to said assembly supporting means including a first plate adapted to be rigidly connected to said assembly supporting means, and having a dove-tail flange on the side thereof opposite said supporting means, said flange extending generally perpendicularly of said supporting platform, a second plate rigidly secured to said platform having a dove-tail recess adapted to slidably receive said flange; and means slidably mounted in said first plate and rigidly connected to said second plate for holding said flange in said recess while permitting relative movement between said first and second plates; said last mentioned means including an elongated rod slidably mounted on said first plate adjacent said flange and having a threaded end threadedly engaged with a boss rigidly secured to said second plate, a nut on said threaded end remote from the free end thereof, and spring means surrounding said rod and operative between said nut and said first plate to bias said rod in said platform downwardly towards the joint to be welded.

11. The welding head clamping and oscillating assembly as defined in claim 10 wherein said platform includes a guide wheel rotatably mounted thereon along an axis substantially perpendicular to the path of travel of said assembly, said guide wheel being adapted to engage the surface of an adjacent workpiece and cooperate with said spring to maintain said platform and the welding head mounted thereon a predetermined distance from the surface of said workpiece.

12. The welding head clamping and oscillating assembly as defined in claim 11 wherein the axis of rotation of said wheel extends perpendicularly to said rod and lies in a common plane therewith.

13. A welding head clamping and oscillating assembly for use in a welding machine having means for supporting and moving said assembly along a joint to be welded, said assembly comprising, a support platform, means for connecting said support platform to the assembly supporting means of a welding machine, a support plate, means for freely slidably mounting said support plate on said support platform for reciprocal movement in a direction transverse to said joint, a welding head clamp, means for pivotally mounting said clamp on said support plate for arcuate oscillating movement in a direction substantially parallel to the direction of the slidable mounting of said support plate, a reversible stepping motor operatively connected to said clamp for oscillating the clamp about its pivot axis, and a metal brake bar rigidly secured to said platform, and a selectively activated electrical solenoid rigidly mounted on said support plate in closely spaced relation to said brake bar, said solenoid being adapted, when activated, to attract and hold said brake bar in fixed position with respect thereto whereby said support plate is held against movement with respect to said platform.

14. The welding head clamping and oscillating assembly as defined in claim 1 including a rack gear mounted on said support platform and a selectively operable reversible electrical motor mounted on said support plate, said reversible electrical motor having an output shaft and a pinion mounted on the free end thereof for cooperation with said rack gear whereby the relative position of said support plate with respect to said platform may be varied by operation of said reversible electric motor.

15. A welding head clamping and oscillating assembly for use in a welding machine having means for supporting and moving said assembly along a joint to be welded, said assembly comprising, a support platform, means for connecting said platform to the assembly supporting means of a welding machine, a support plate, means for freely slidably mounting said support plate on said support platform for reciprocal movement in a direction transverse to said joint, a pivot shaft rotatably mounted on said support plate and extending generally perpendicularly thereto, a spur gear rigidly secured to said shaft, a reversible stepping motor having an output shaft extending perpendicularly to said pivot shaft and a worm gear secured to the end of said output shaft in meshing engagement with said spur gear whereby said pivot shaft is adapted to be oscillated about its axis of rotation by said stepping motor, a welding head clamp rigidly connected to said pivot shaft for oscillation therewith in a plane extending substantially parallel to said support plate and in a direction substantially parallel to the direction of sliding movement of said support plate, a rack gear mounted on said support platform and a selectively operable reversible electric motor mounted in said support plate, said reversible electric motor having an output shaft and a spur gear mounted on the free end thereof for cooperation with said rack gear whereby the relative position of said support plate with respect to said platform may be varied by operation of said reversible electric motor.

* * * * *